Sept. 5, 1933.  A. J. ESCOTT  1,925,237
ROTARY SWITCH
Filed July 13, 1931
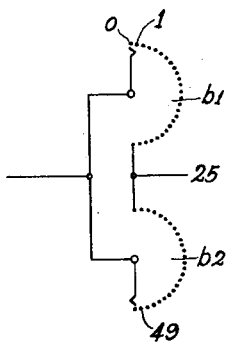
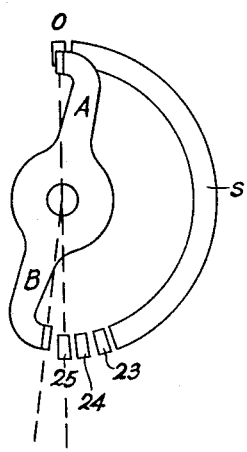
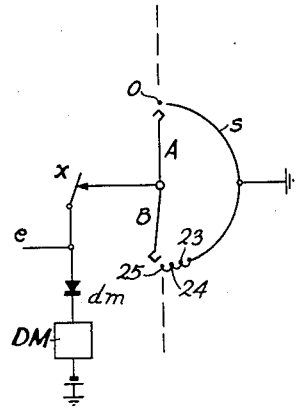
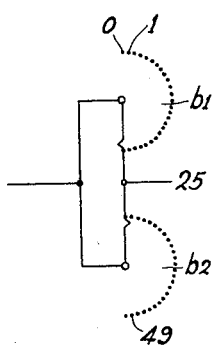
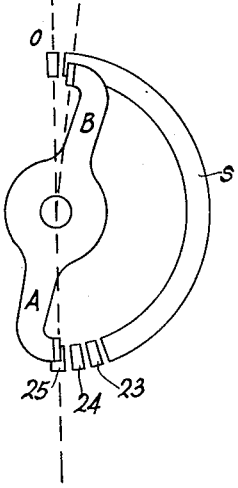
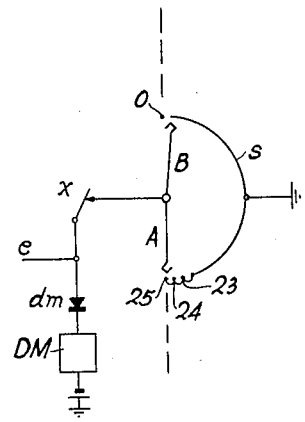
Inventor
Alexander John Escott Patented Sept. 5, 1933

1,925,237

UNITED STATES PATENT OFFICE 1,925,237

ROTARY SWITCH

Alexander John Escott, London, England, assignor to Siemens Brothers & Company Limited, London, England Application July 13, 1931, Serial No. 550,324, and in Great Britain August 7, 1930

14 Claims. (Cl. 179—18)

The present invention relates to electric rotary switches of the type used in telephone and signalling systems.

The invention is particularly adapted for application to rotary switches comprising sets of wipers with corresponding contact banks the banks being in different planes and different wiper sets traversing their contact banks at different times.

In order to ensure in such switch that on return to normal one particular set of wipers occupies a position in which it will be the first to enter a bank a homing wiper and bank has hitherto been provided for each set and appropriately connected.

In the present invention a switch with a plurality of spaced wiper sets is so arranged that its return to a particular position is obtained using a single homing bank.

In carrying out the invention wipers corresponding in number to the wiper sets employed are electrically connected and are in the same plane so that all of them can traverse the homing bank.

They are not equiangularly spaced as are the other wiper sets but are so arranged that when any wiper leaves the homing segment another wiper has come into contact with that segment except as regards a particular wiper which is associated with the set that is to be the first to enter banks after the switch has reached its normal position.

It may be arranged that in homing action caused as a result of a wiper being on its homing bank all wipers but one move by the angle subtended by the bank including the normal contacts or position and that as regards the other wiper a shorter movement results due to its being staggered.

The accompanying drawing illustrates one manner in which the invention may be carried into effect, the invention being described by way of example as applied to a step-by-step rotary switch in which wipers are rotated in succession over banks of contacts in different planes and subtending angles of 180 degrees, there being one wiper for each bank of contacts. The invention, however, may be applied to any type of rotary switch in which the wipers are required to be set to normal after the switch has been used.

Fig. 1 illustrates the off-normal or homing bank of the switch comprising the normal contact "0", the segment "S" and the separate contacts 23, 24 and 25. These latter contacts contacts may not be provided in which case, the segment "S" will extend to the position occupied by contact 25. On the contrary the bank may wholly comprise separate contacts, the contacts being commoned together such as 23, 24 and 25. Whether commoned contacts or a segment are used or a segment plus contacts connected thereto the whole of the commoned parts is considered as the homing contact segment. The wipers A and B, which may be formed in one stamping or from two separate stampings clamped together, are shown in their normal positions, that is, with the tip of the wiper A connecting with contact 0.

The wipers A and B are not in diametrical alignment but are staggered, the angle between their axes being equal to the angle subtended between two consecutive bank contacts such as contacts 24 and 25. Thus it will be seen that although contact 0 is diametrically opposite contact 25, wiper A is connecting with contact 0 whilst wiper B is in a position corresponding to an assumed contact 26.

In Fig. 2 is illustrated the position of the wipers after they have been rotated through 180 degrees, the wiper A resting on contact 25 whilst wiper B is resting on the segments. Fig. 3 shows the bank diagrammatically, the wipers being in their normal position, and a skeleton circuit for stopping the switch, whilst Fig. 4 shows the same arrangement after rotation of the wipers through 180 degrees. The rectangle DM is the driving magnet of the switch and contacts $dm$ interrupter contacts. The switch is of the reverse drive type, that is one wherein the wipers are stepped on the de-energization of the driving magnet. The contact $x$ is the contact of a relay (not shown), the contact $x$ being opened to disconnect the homing circuit of the driving magnet when the switch is engaged or when stepping to a certain position.

Fig. 5 shows diagrammatically two other banks $b1$ and $b2$ of the switch, the banks in practice lying side by side and parallel with the homing bank. The wipers are shown in their normal position, that is, with the upper wiper resting on contact "0" whilst the lower wiper rest on contact 50. Fig. 6 shows the position of the wipers after rotation through 180 degrees. Considering, the rotation of the wipers in a clockwise direction, the upper wiper successively connects with the contacts in its bank whilst the lower wiper is out of its bank, and likewise the lower wiper engages with its bank when the upper wiper is out of its bank. The contacts of these banks are connected to external circuits 1—25 and 25—49.

Several of such pairs of banks and wipers may be provided.

Considering the actual operation of the arrangement when the switch is to be operated an earth is applied over the lead $e$, the earth passing through interrupter contacts $dm$, driving magnet DM, to battery and earth. The magnet DM energizes and in doing so opens the interrupter springs $dm$ and thus disconnects its own circuit. The contact $x$ opens simultaneously with the application of earth to the lead $e$ in a manner well understood in the art. Upon the de-energization of the driving magnet DM the wipers of the switch are stepped one step, the wiper A engaging with the segment S, whilst the wiper of bank $b1$ engages with the first contact in the bank, and the wiper of bank $b2$ is stepped out of engagement with the bank.

As long as the earth remains on the lead $e$ the wipers continue to be stepped under the control of the interrupter springs $dm$, this earth however being removed when a desired circuit, of the circuits 1—49, is found.

During the engagement of the switch contact $x$ remains open, but when the switch is to be restored this contact closes and establishes a circuit from earthed segment S or contact 23, 24 or 25, arm A or B of the homing wiper, contact $x$, interrupter contacts $dm$, driving magnet DM to battery and earth. The switch will step over this circuit under control of the interrupter springs until the wipers reach their normal position where the above circuit will be opened at wiper B.

It will be seen that if the wipers of the switch are resting on a contact in blank $b1$ the homing circuit exists over wiper A until contact 25 is reached in which position owing to the staggering of the wipers, wiper B enters on to the segment S. The homing circuit is, therefore, maintained until the wiper A reaches the normal contact, that is, during the traversal of the banks $b1$ and $b2$ by their respective wipers.

The form of switch described by way of example is one in which duplicate wiper sets are provided and the banks including normal positions extend over an arc of 180°. The invention is also applicable to switches which have more than two sets of wipers. In the case of a switch having three sets of wipers and banks extending over 120° three electrically connected homing wipers would be provided. The two wipers corresponding to wipers A and B would again be so spaced so that the corresponding wiper B has taken one step from the homing contact segment to clear the bank when the corresponding wiper A is in the normal position. The third wiper would be set at angle of 120° to the wiper A.

What is claimed is:

1. A rotary switch equipped with a plurality of wiper sets cooperating with different bank contact sets and so arranged that only one wiper set at a time is in engagement with an active contact of its associated bank, a home position for the switch including a particular contact in the bank engaged by one of said wiper sets, and automatic means for restoring the switch to home position when not in use.

2. A rotary switch equipped with a plurality of wiper sets cooperating with different bank contact sets and so arranged that only one wiper set at a time is in engagement with an active contact of its associated bank, a home position for the switch including a particular contact in the bank engaged by one of said wiper sets, and a plurality of electrically connected wipers cooperating with a homing bank contact set for restoring the switch to home position when not in use.

3. A rotary switch equipped with two sets of wipers cooperating with different bank contact sets and so arranged that only one wiper set at a time is in engagement with an active contact of its associated bank, a home position for the switch including a contact in the bank engaged by one of said wiper sets, means for operating the switch from home position to set either wiper set on a contact of its associated bank, and means for automatically restoring the switch to said home position regardless of the position to which it was previously operated.

4. A rotary switch equipped with a pair of wipers mounted on a single shaft and cooperating one at a time with different bank contact sets, a home position for the switch designated by a particular contact in the bank engaged by one of said wipers, means for variably operating the switch to cause either wiper to engage a contact of its associated bank to complete a connection, and automatic means for restoring the switch to said home position at the termination of the connection regardless of the particular wiper involved in that connection.

5. A rotary switch equipped with a pair of wipers mounted on a single shaft and cooperating one at a time with different bank contact sets, a home position for the switch designated by a particular contact in the bank engaged by one of said wipers, means for operating the switch to extend a connection via either of said wipers and a contact of its associated bank, a pair of electrically connected wipers mounted on said shaft cooperating with a single bank contact set, and means including said last pair of wipers for restoring the switch to said home position responsive to the termination of a connection established over either of said first wipers.

6. A rotary switch equipped with a pair of wipers mounted on a single shaft and cooperating one at a time with different bank contact sets, a home position contact in the bank engaged by one of said wipers, means for operating the switch from home position to set either wiper on a contact of its associated bank, and automatic means for restoring the switch to normal by returning said one wiper to said home position contact regardless of the position in which the wipers were previously set.

7. In combination, a step-by-step rotary switch, a plurality of sets of wipers mounted on a single shaft cooperating one at a time with different bank contact sets, a normal position contact in the bank accessible to one wiper set, a homing bank comprising a normal position contact and a homing segment, and a plurality of electrically connected wipers cooperating one at a time with said homing bank so arranged that with said one wiper set positioned on its normal position contact, the last said wipers are each separated from the homing segment by one step.

8. In combination, a step-by-step rotary switch, a plurality of wiper sets mounted on a single shaft cooperating one at a time with different bank contact sets, a homing bank including a normal position contact and a homing segment, and a plurality of electrically connected wipers cooperating one at a time with said homing bank and so arranged that with one of said first wiper sets engaging the first contact of its associated bank each of the last said wipers is separated from the homing segment by one step, and with the other of said first wiper sets engaging the first contact of its associated bank both of the last said wipers are in engagement with the homing segment.

9. A rotary switch equipped with a plurality of wiper sets cooperating one at a time with different bank contact sets, means for operating the switch to position either wiper set on contacts in its associated bank, and means for restoring the switch to normal position so that the same wiper set is always the first to engage its associated bank.

10. A rotary switch, a pair of wipers for the switch in diametrical alignment, a set of bank contacts extending over an arc of 180° accessible to said wipers, a similar set of bank contacts for effecting the positioning of said wipers, and a second pair of wipers for the switch adapted to engage said second set and aligned at an angle of 180° plus the angular distance between consecutive contacts of the contact set.

11. A rotary switch, sets of bank contacts extending over an arc of 180°, and two pairs of wipers for the switch mounted on a single shaft, the first pair of said wipers being in diametrical alignment, and the second pair of said wipers being aligned at an angle of 180° plus the angular distance between consecutive contacts of said bank contact sets.

12. A rotary switch, a shaft for the switch, sets of bank contacts extending over an arc of 180° associated with said switch, two separate electrically connected wipers mounted on said shaft in diametrical alignment adapted to cooperate with different ones of said contact sets, and a single wiper also mounted on said shaft having two projecting members for engaging contacts of one of said contact sets, said members being aligned at an angle of 180° plus the angular distance between consecutive contacts of said bank contact sets.

13. A wiper adapted to engage a multi-contact bank by means of contacting numbers formed at each of its two ends in which the said members subtend an arc of 180° plus the angular distance between two consecutive contacts of the bank engaged thereby.

14. A wiper for an automatic switch, said wiper having contact members formed at each of its two ends, said members subtending an arc of 180° plus the angular distance between two consecutive contacts of the contact bank used with the switch.

ALEXANDER JOHN ESCOTT.